May 2, 1950            T. CURZON            2,505,854

SOUND ABSORBING CASING FOR NOISE EMITTING APPARATUS

Filed June 8, 1948            3 Sheets-Sheet 1

Inventor
T. Curzon

May 2, 1950     T. CURZON     2,505,854
SOUND ABSORBING CASING FOR NOISE EMITTING APPARATUS
Filed June 8, 1948     3 Sheets-Sheet 3

Inventor
T. Curzon

Patented May 2, 1950

2,505,854

UNITED STATES PATENT OFFICE 2,505,854

SOUND ABSORBING CASING FOR NOISE EMITTING APPARATUS

Thomas Curzon, London, England, assignor to C. A. V. Limited, London, England

Application June 8, 1948, Serial No. 31,822
In Great Britain June 20, 1947

5 Claims. (Cl. 181—33)

This invention relates to ventilated housings for apparatus adapted to receive rotary or other motion, and has for its object to minimise the audibility of the noise made by such apparatus when in use.

Figure 1:
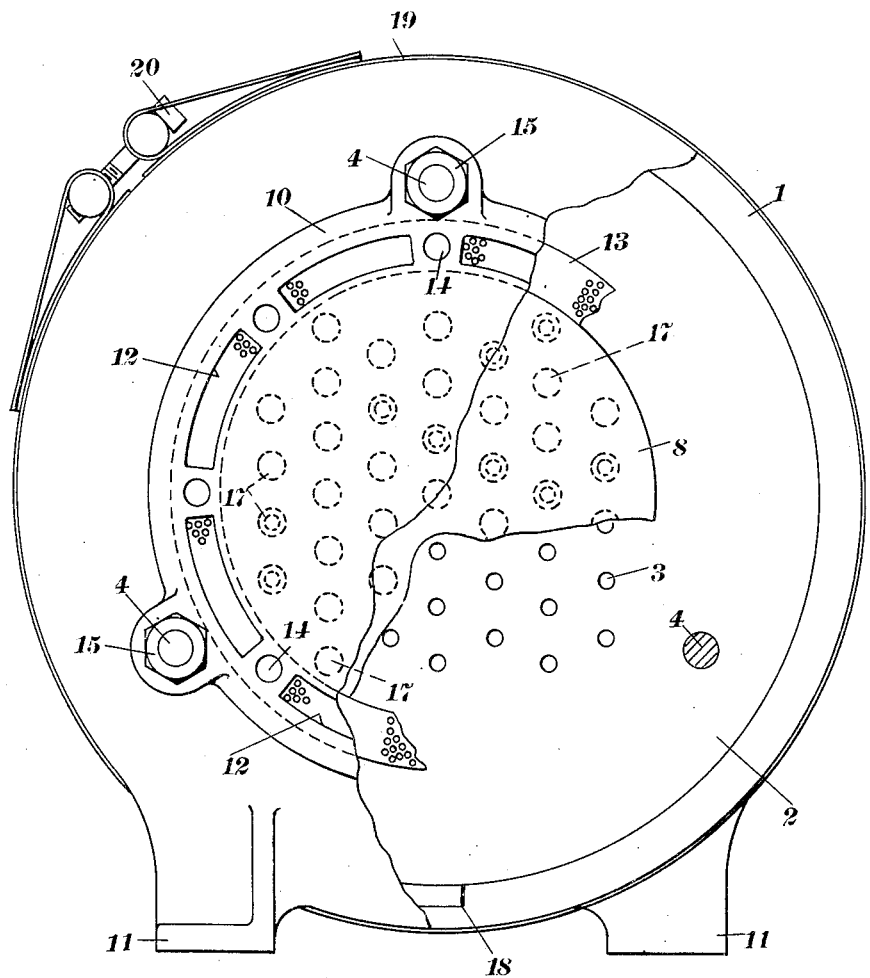
Figure 1 is an end elevation showing the housing partly broken away, of a ventilated housing for a rotary electric transformer constructed in accordance with the invention.

In carrying the invention into effect according to one convenient mode as applied by way of example to a ventilated housing for a rotary electric transformer, there is provided a cylindrical casing 1 made from asbestos or other sound-insulating material and having open ends. The open ends of the casing are closed by circular ventilating plates 2 which are formed with a plurality of small perforations 3, and which are also made from asbestos or other sound-insulating material. The plates 2 fit within the casing 1 and have holes through which extend three (or more) rods 4 which are situated parallel with the axis of the casing at equal distances apart and from the said axis, so that the rotary transformer can be arranged between and spaced from the rods.

For resiliently suspending the transformer 5 within the casing there is provided a rubber or like flexible band 6 which passes around the rods 4, and metal clips 7 which serve by securing together parts of the band at the inner sides of the rods to cause the band to embrace closely the rods and a stationary cylindrical portion of the transformer 5.

At the outer side of each ventilating plate 2 is arranged a circular sound-reflecting baffle plate 8 which is likewise made of asbestos or other sound-insulating material, and which has an inner surface 9 spaced from the ventilating plate. Each baffle plate is secured by screws or other means to a circular metal supporting plate 10 which in turn is secured to the adjacent ventilating plate 2, and which is formed at one side with lugs 11 or other means whereby it can be secured to a fixed support. Near its periphery each metal supporting plate is formed with arcuate slots 12 or other openings for connecting the space between the associated ventilating and baffle plates to the outer atmosphere, and these openings may be provided at their inner sides with perforated screens 13 secured by rivets 14.

The metal supporting plates 10 are secured in close contact with the adjacent ends of the casing 1 by nuts 15 on the outer ends of the rods which extend through the casing and the ventilating plates, the outer ends of the rods being screw-threaded and arranged to extend through holes in the supporting plates 10. These rods may be provided with shoulders or collars 16 which serve by contact with the inner sides of the ventilating plates 2 to secure the latter to the supporting plates. Alternatively the ventilating plates may be secured to the supporting plates by screws.

The inner surfaces of the baffle plates 8 are formed with recesses 17 corresponding in number and situated opposite to the perforations 3 in the associated ventilating plates. These recesses are preferably made to a conical form with their opposite sides at 90° to each other, but in any case the shape of the recesses is such that sound-waves emanating from the transformer and passing through the perforations in the ventilating plates are reflected back into the casing through the same perforations by the baffle plate recesses situated opposite to the perforations. In this way communication of the sound-waves to the outer atmosphere is prevented.

Figure 2:
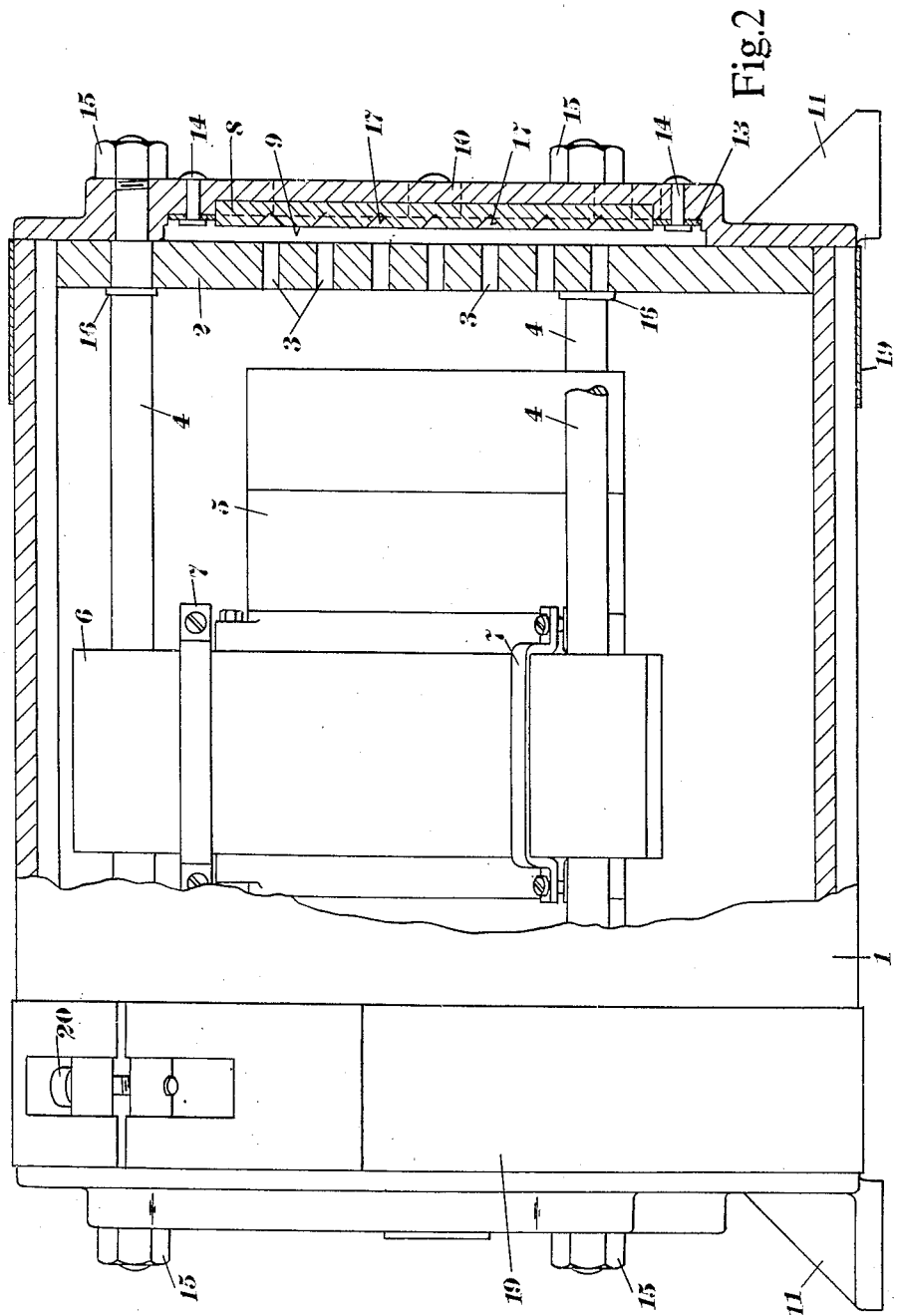
Figure 2 is a side elevation of the housing, shown partly in section.
Figure 3:
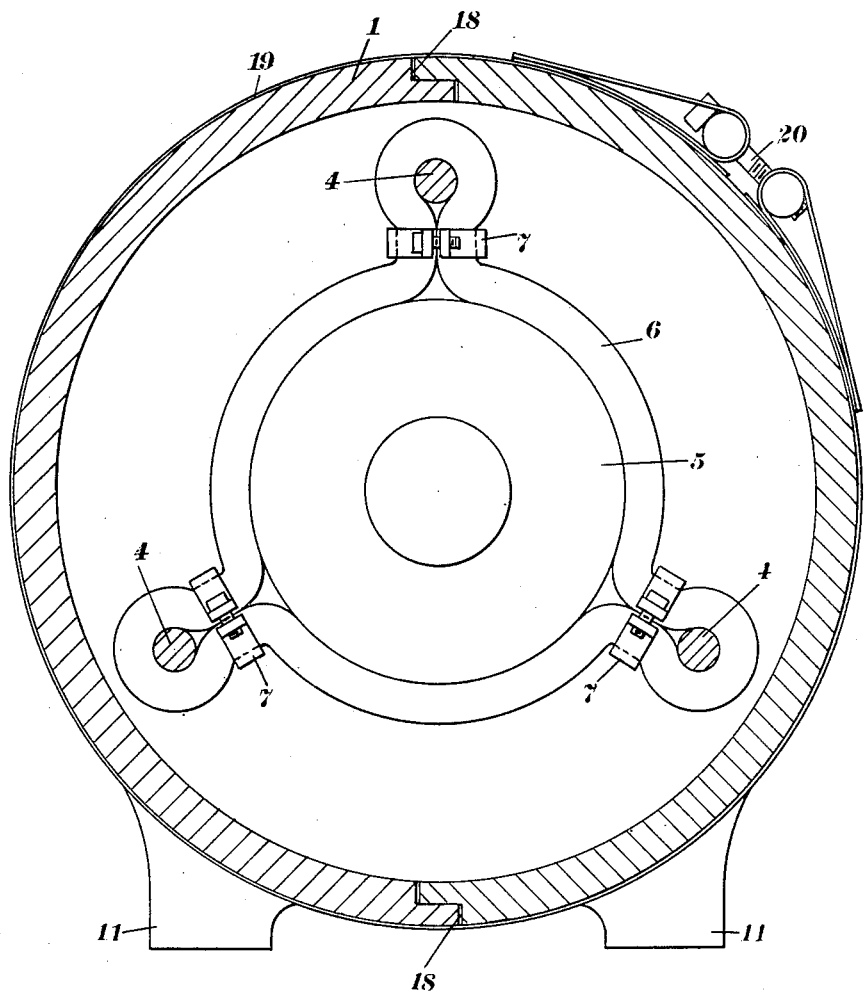
Figure 3 is a cross-section of the housing.

If desired and as shown in the Figures 2 and 3, the casing may be made in two semi-cylindrical halves having complementary stepped edges 18 in which case the two halves may be detachably secured together by flexible bands 19 surrounding the casing, the adjacent ends of each band being interconnected by any convenient tensioning device 20.

Alternatively the casing may be of composite construction; for example it may be composed of a thin outer cylinder of metal or other suitable material and an inner cylinder of perforated material, the intervening space being filled with felt or other sound-insulating substance.

It is preferred to provide a diaphragm which may be of any convenient form, between the rotary transformer or other apparatus and the casing, with the object of preventing the circulation of air within the casing. Such diaphragm may be disposed at any intermediate point in the casing and may be supported on the rods 4 if desired.

By this invention I am able to house a rotary electric transformer in a manner which minimises the audibility of the noise made by such a transformer when in use.

The invention is not, however, limited to housings for rotary electric transformers, as it may be applied to housings for other apparatus adapted to receive rotary or other motion when in use. Moreover the invention is not limited to the example above described as constructional details may be varied to suit requirements. Thus, the casing may be of rectangular or other non-cylindrical form, and may be provided with ventilating and baffle plates as above described at more than two positions.

Having thus described my invention what I claim as new and desire to secure by Letters Patent is:

1. A ventilated housing for accommodating and minimising audibility of noise emanating from noise-emitting apparatus, comprising a casing having at least two ventilating plates each formed with a plurality of small perforations through which sound-waves from the interior of said casing can pass, and at least two sound-reflecting baffle plates respectively mounted at the outer sides of said ventilating plates and formed at positions opposite to said perforations with recesses whereby sound-waves passing from the interior of said casing through said apertures are reflected back into said casing through the same perforations, said ventilating and baffle plates consisting of sound-insulating material.

2. A ventilating housing as claimed in claim 1, in which said casing is of cylindrical form and has end walls formed by said ventilating plates.

3. A ventilating housing as claimed in claim 1 and having means for resiliently suspending the noise-emitting apparatus within said casing, said means comprising in combination a plurality of rods extending longitudinally through said casing, a flexible band passing around said rods, and clips for securing together parts of said band at the inner sides of said rods to cause said band to embrace said rods and said apparatus.

4. A ventilating housing as claimed in claim 1 and having supporting plates on which said baffle plates are mounted, and which are secured to said ventilating plates, said supporting plates being provided with openings through which the perforations in said ventilating plates communicate with the outer atmosphere.

5. A ventilating housing as claimed in claim 1, in which the openings in said supporting plates have the form of slots and are provided at their inner sides with perforated screening means.

THOMAS CURZON.

REFERENCES CITED

The following references are of record in the file of this patent:

UNITED STATES PATENTS

| Number | Name | Date |
| --- | --- | --- |
| 1,165,288 | Rimmer | Dec. 21, 1915 |
| 1,705,778 | Munroe | Mar. 9, 1929 |